United States Patent
Wang et al.

(10) Patent No.: US 10,834,351 B2
(45) Date of Patent: Nov. 10, 2020

(54) BITLINE SETTLING SPEED ENHANCEMENT

(71) Applicant: OmniVision Technologies, Inc., Santa Clara, CA (US)

(72) Inventors: Rui Wang, San Jose, CA (US); Tiejun Dai, Santa Clara, CA (US); Ling Fu, Santa Clara, CA (US); Jiayu Guo, Milpitas, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 0 days.

(21) Appl. No.: 16/199,887

(22) Filed: Nov. 26, 2018

(65) Prior Publication Data

US 2020/0169682 A1 May 28, 2020

(51) Int. Cl.
*H04N 5/378* (2011.01)
*H04N 5/369* (2011.01)
*H04N 5/376* (2011.01)

(52) U.S. Cl.
CPC .......... *H04N 5/378* (2013.01); *H04N 5/3698* (2013.01); *H04N 5/3765* (2013.01)

(58) Field of Classification Search
CPC ..... H04N 5/378; H04N 5/3765; H04N 5/3698
See application file for complete search history.

(56) References Cited

U.S. PATENT DOCUMENTS

| | | | |
|---|---|---|---|
| 10,290,673 B1 * | 5/2019 | Wang | H04N 5/23241 |
| 2019/0052820 A1 * | 2/2019 | Berner | H04N 5/345 |

* cited by examiner

*Primary Examiner* — Tony Ko
(74) *Attorney, Agent, or Firm* — Christensen O'Connor Johnson Kindness PLLC

(57) ABSTRACT

An image sensor includes pixel circuitry with a photodiode to receive light and output a pixel signal. The image sensor also includes readout circuitry with a first sample and hold transistor coupled to the pixel circuitry, and a first capacitor coupled to the first sample and hold transistor to receive the pixel signal. A second sample and hold transistor is coupled to the pixel circuitry, and a second capacitor is coupled to the second sample and hold transistor to receive the pixel signal. A first output switch is coupled to output the pixel signal from the first capacitor, and a second output switch is coupled to output the pixel signal from the second capacitor. A boost transistor is coupled to connect the first output switch and the second output switch when the boost transistor is turned on.

20 Claims, 6 Drawing Sheets

BITLINE SETTLING SPEED ENHANCEMENT

TECHNICAL FIELD

This disclosure relates generally to electronic devices, and in particular but not exclusively, relates to image sensors.

BACKGROUND INFORMATION

Image sensors have become ubiquitous. They are widely used in digital still cameras, cellular phones, security cameras, as well as medical, automobile, and other applications. The technology used to manufacture image sensors has continued to advance at a great pace. For example, the demands of higher speed and lower power consumption have encouraged the further miniaturization and integration of these devices.

The typical image sensor operates as follows. Image light from an external scene is incident on the image sensor. The image sensor includes a plurality of photosensitive elements such that each photosensitive element absorbs a portion of incident image light. Photosensitive elements included in the image sensor, such as photodiodes, each generate image charge upon absorption of the image light. The amount of image charge generated is proportional to the intensity of the image light. The generated image charge may be used to produce an image representing the external scene.

Image sensors generally have readout circuitry to readout image or pixel data from the photosensitive elements. The speed of readout from the photosensitive elements may be limited by physical parameters of the readout circuitry (e.g., settling time).

BRIEF DESCRIPTION OF THE DRAWINGS

Non-limiting and non-exhaustive examples of the invention are described with reference to the following figures, wherein like reference numerals refer to like parts throughout the various views unless otherwise specified.

Figure 1A:
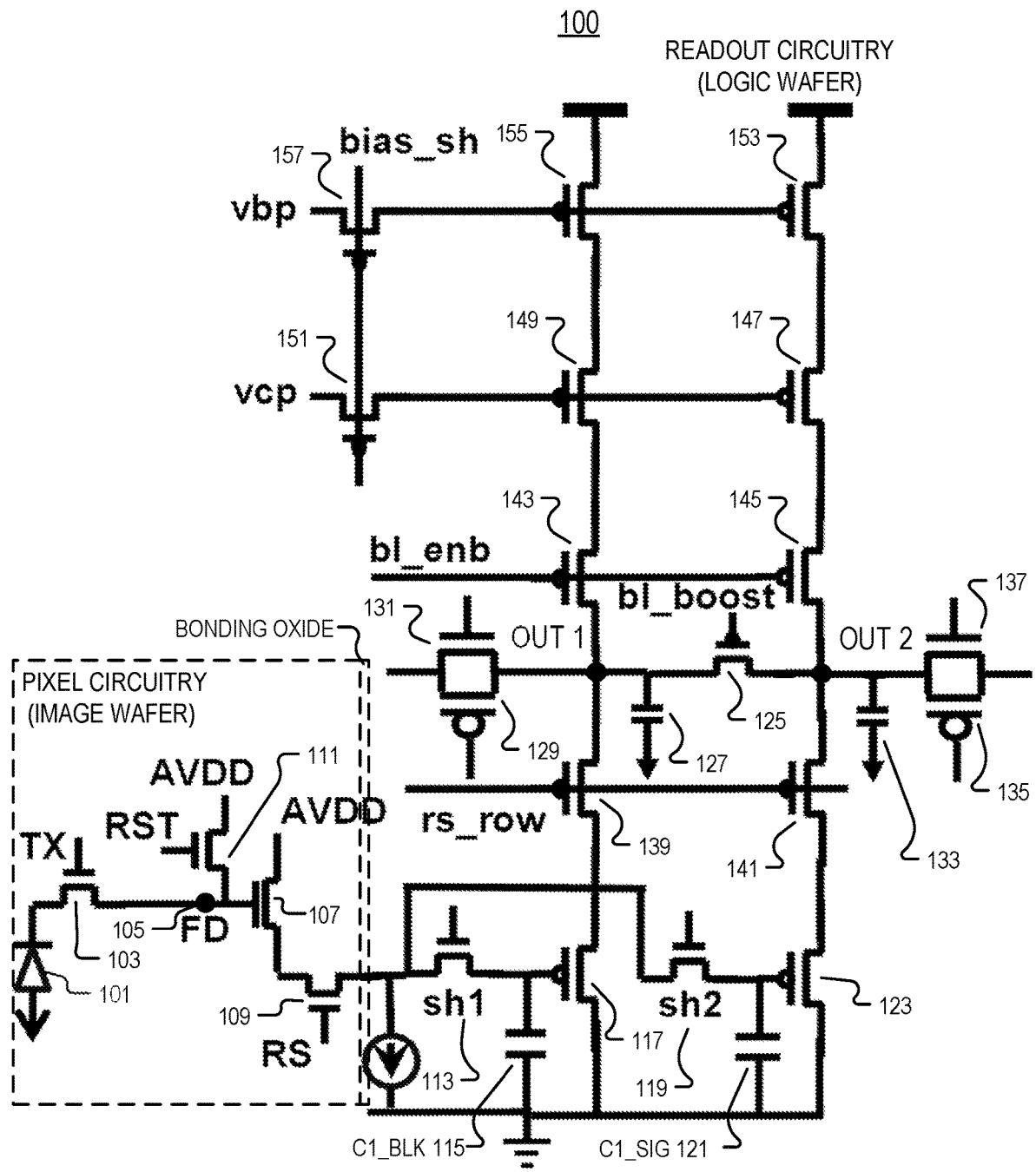
FIG. 1A shows one example of a circuit diagram of part of an image sensor, in accordance with the teachings of the present disclosure.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

Examples of an apparatus and method for enhancing bitline settling speed are described herein. In the following description, numerous specific details are set forth to provide a thorough understanding of the examples. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one example" or "one embodiment" means that a particular feature, structure, or characteristic described in connection with the example is included in at least one example of the present invention. Thus, the appearances of the phrases "in one example" or "in one embodiment" in various places throughout this specification are not necessarily all referring to the same example. Furthermore, the particular features, structures, or characteristics may be combined in any suitable manner in one or more examples.

Some image sensor designs may use a bitline floating method with a specified time control method by disabling the bitline during transfer, so as to enhance bitline settling speed by reducing signal coupling. The technique has the advantage of improving the settling speed while maintaining a similar design architecture. However, the bitline time control method may need to be redesigned to address bitline floating node swing fluctuation and floating diffusion coupling.

Theoretically, image sensor bitlines settle naturally and follow an RC time delay function without using a bitline settling boost function.

If bitline settling time is calculated by the following equation, $$t_{settle} = \tau \cdot \ln \frac{V_{in/2}}{V_{0.5 LSB}}$$

then the bitline has a long settling time with a large voltage swing. The situation with a current slew event is even worse in a large signal settling condition. As will be disclosed, with a differential bitline design in accordance with the teachings of the present disclosure, the system is able to exploit this new architecture to accelerate settling time of the bitline. Although the settling speed itself (compared to a non-differential, single bitline design) can already be decreased by half (because the system has the potential to half the input range), the time constant may still be limited by RC delay, unless the bitline short method for voltage domain global shutter design, presented herein, is implemented.

The example bitline short methods disclosed herein come from the concept of capacitor charge redistribution. If there are two unbalanced capacitors in a parallel connection, once a switch between them is turned on, charge redistribution occurs, and the voltage will settle down towards the same value. The RC delay for charge redistribution is Rs(C1/C2), where Rs represents resistance through the switch path. When the bitline short structure is incorporated in the example circuits presented herein, there is a large decrease in settling time since Rs here is much smaller than resistance on the bitlines.

As will be shown, examples disclosed herein may be used for voltage domain global shutter (VDGS) products with differential bitlines. The structures and methods presented herein improve bitline settling speeds during the black (reference) signal and image signal average period by implementing a bitline short. This specific bitline short approach includes (1) the black signal and image signal read out operating simultaneously on two separate bitlines; and (2) after the average, the output will be settled at, or near, the midpoint of the black signal and image signal level. Under this condition, the bitline short method can settle down output 1 and 2 (see e.g., FIGS. 1A-2B) nodes in advance, and thus significantly reduce the time consumed by an analog to digital converter operating during black signal and image signal average periods.

As will be shown in the figures, the circuit structure design improvements include one additional bl_boost switch (e.g., "bl_boost"), such as an NMOS, PMOS, or transmission gate between output 1 (e.g., "Out 1") and output 2 (e.g., "Out 2"). This switch is coupled between output 1 and output 2, and when it turns on, the switch immediately pulls output 1 and 2 together to a midpoint. The timing improvement has two purposes (1) settle down outputs 1 and 2 by shorting them; and (2) keeping the mismatch and leakage offset information in storage capacitance using a short and release operation.

Figure 1B:
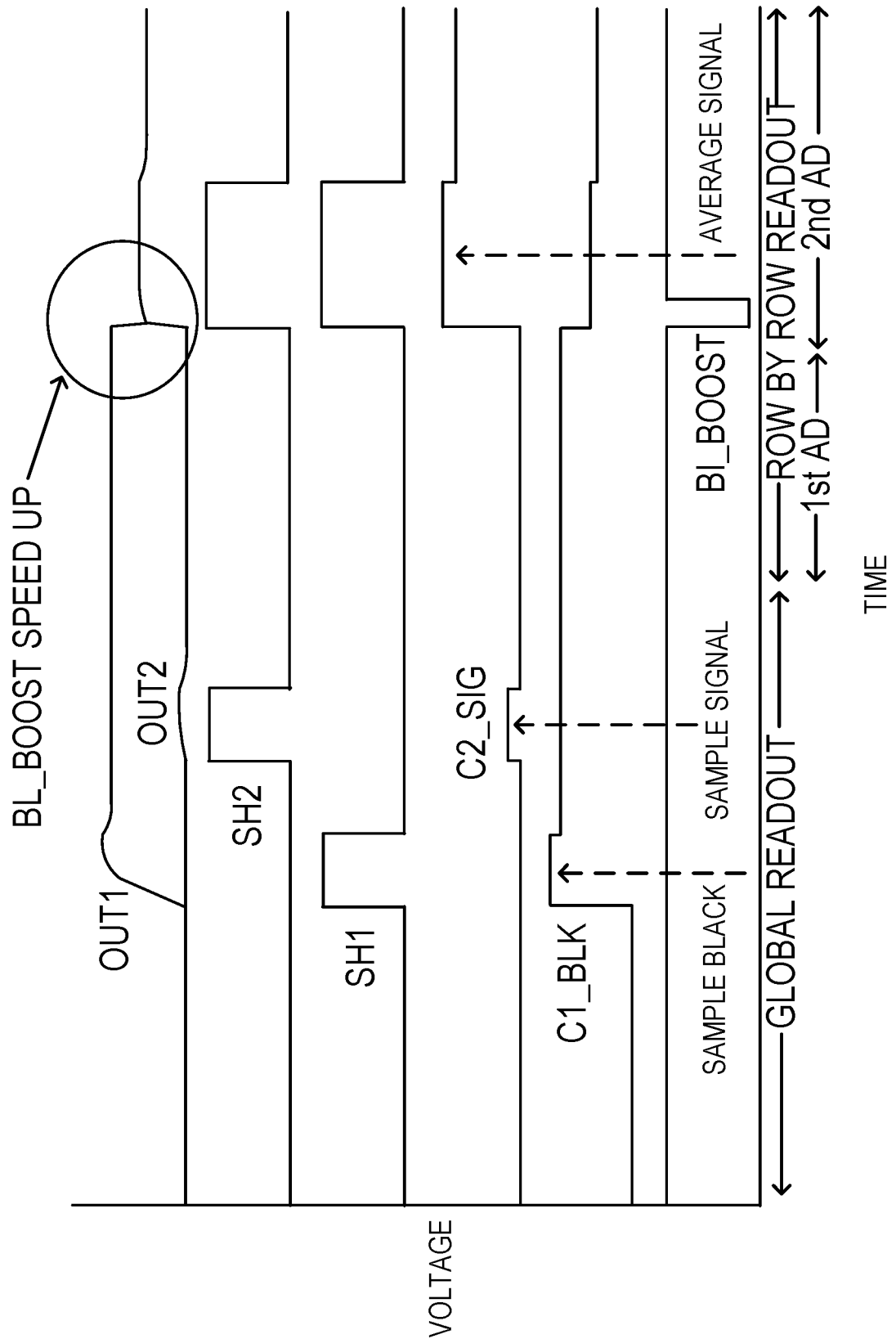
FIG. 1B illustrates a timing diagram for the circuit diagram of FIG. 1A, in accordance with the teachings of the present disclosure.
Figure 2A:
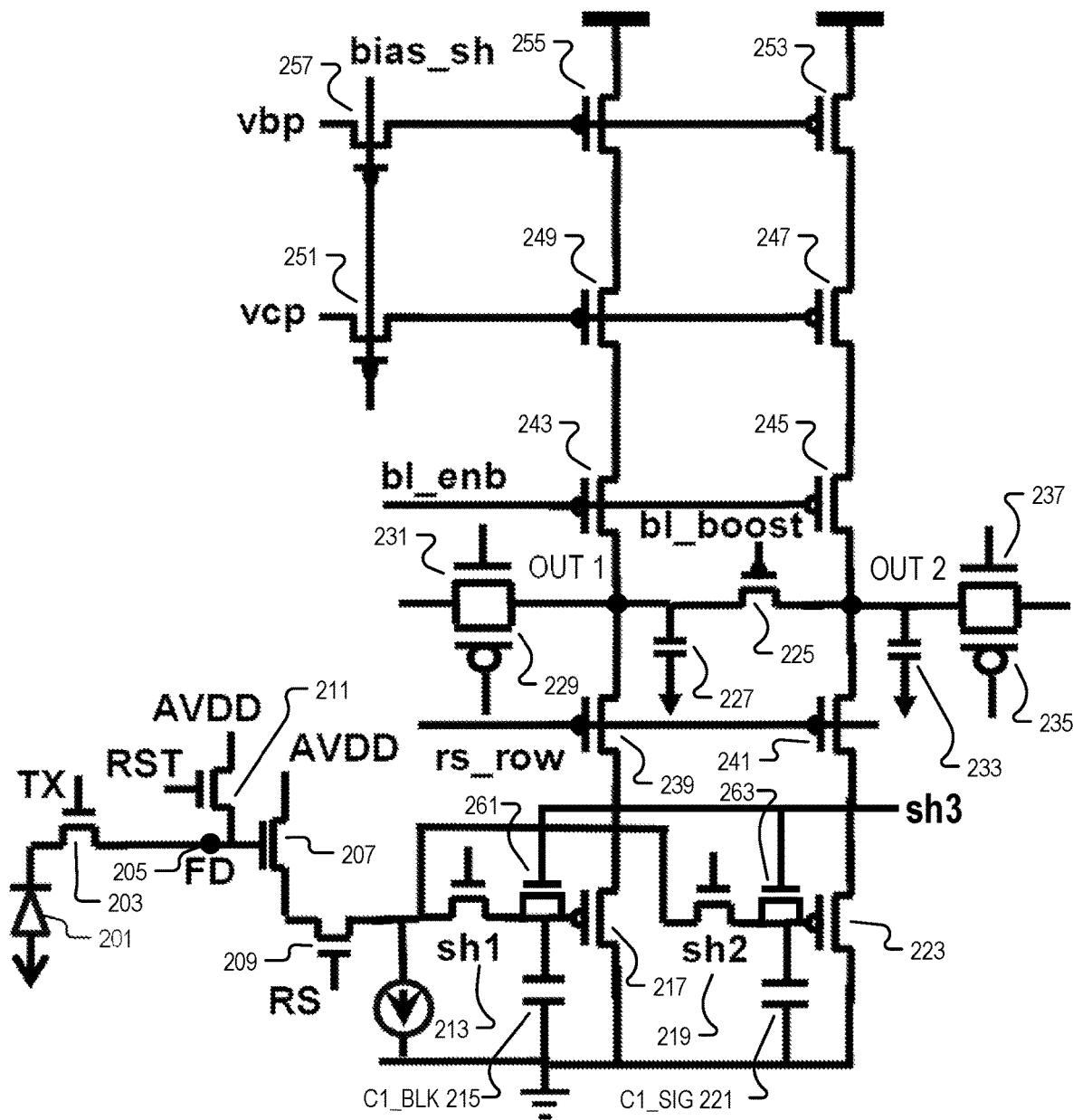
FIG. 2A shows one example of a circuit diagram of part of an image sensor, in accordance with the teachings of the present disclosure.

During a VDGS global readout period, the black signal and the image signal are captured and stored separately in these two capacitors at nodes C1_blk and C1_sig (see e.g., FIGS. 1A and 2A). At the 1st analog to digital conversion (see e.g., "$1^{st}$ AD" in FIG. 1B), the comparator will transfer mismatch information out of the circuit with the black signal and image signal as out 1 and out 2 DC levels. At the second analog to digital conversion (see e.g., "2nd AD" in FIG. 1B), the black signal and image signal voltages will average together and drive output 1 and output 2 close to the middle of the black signal and image signal levels. At the moment of averaging, sample and hold 1 (e.g., "sh1" in FIGS. 1B and 2B) and sample and hold 2 (e.g., "sh2" in FIGS. 1B and 2B) transistors open at the same time. The system here may turn on the bl_boost switch right after, or slightly before, sample and hold 1 and sample and hold 2 open, and the performance of the bitline boost is similar. Since RC delay limits the bitline settling speed, the bitline short method overcomes this disadvantage by quickly shorting output 1 and output 2 nodes to the same middle potential. Lastly, before sample and hold 1 and sample and hold 2 turn off, the bl_boost should be closed first. This is so the circuit recognizes and keeps bitline mismatch information. Since the final voltage of output 1 and output 2 might be slightly different due to a mismatch, as long as this difference is kept in the 2nd analog to digital conversion (e.g., "$2^{nd}$ AD" in FIG. 1B), by adapting a correlated double sampling (CDS) method, the mismatch may be canceled out eventually. This mismatch should not be a dominant source of slow settling, considering its relatively small swing value.

To illustrate, the embodiments discussed above, and other embodiments, will be described below as they relate to the figures.

FIG. 1A shows an example circuit diagram 100 of part of an image sensor, in accordance with the teachings of the present disclosure. Circuit diagram 100 includes pixel circuitry (disposed in an image wafer) and readout circuitry disposed in a logic wafer (which may be bonded to a non-illuminated side of the pixel wafer with a bonding oxide, e.g., silicon oxide, or the like). In the depicted example, the pixel circuitry includes photodiode 101, transfer gate 103, floating diffusion 105, source follower transistor 107, row select transistor 109, and reset transistor 111. As shown, transfer gate 103 is coupled to transfer image charge from photodiode 101 to floating diffusion 105. Source follower transistor 107 is coupled to floating diffusion 105 amplify the charge in floating diffusion 105. Row select transistor 109 is coupled to output a pixel signal (e.g., amplified image charge or a black level reference signal) to readout circuitry. In response to a reset signal applied to the control terminal of reset transistor 111, image charge is reset in the pixel circuitry.

Readout circuitry includes first sample and hold transistor 113, first capacitor 115, transistor 117, second sample and hold transistor 119, second capacitor 121, transistor 123, boost transistor 125, third capacitance 127, fourth capacitance 133, first output switch "OUT 1" (including transistors 129 and 131), second output switch "OUT 2" (including transistors 135 and 137), transistor 139, transistor 141, transistor 143, transistor 145, transistor 147, transistor 149, transistor 151, transistor 153, transistor 155, and transistor 157.

As illustrated, first sample and hold transistor 113 is coupled to the pixel circuitry, and first capacitor 115 is coupled to first sample and hold transistor 113 to receive the pixel signal when first sample and hold transistor 113 is turned on. Second sample and hold transistor 119 is coupled to the pixel circuitry, and second capacitor 121 is coupled to second sample and hold transistor 119 to receive the pixel signal when second sample and hold transistor 119 is turned on. When transistor 139 is on, first output switch ("OUT 1, including NMOS 131 and PMOS 129 transistors) is coupled to output the pixel signal from first capacitor 115. The pixel signal is amplified by amplifier transistor 117—since the control terminal is coupled to first capacitor 115 to amplify a signal on first capacitor 115. Similarly, when transistor 141 is on, second output switch ("OUT 2, including NMOS 137 and PMOS 135 transistors) is coupled to output the pixel signal from second capacitor 121. The pixel signal is amplified by amplifier transistor 123—since the control terminal is coupled to first capacitor 121 to amplify a signal on first capacitor 121. Boost transistor 125 is coupled to connect the first output switch OUT 1 and the second output switch OUT 2 when boost transistor 125 is turned on. As stated above, when boost transistor 125 is on, a voltage at the first output switch OUT 1 and the second output switch OUT 2 is equalized.

In the depicted example, the pixel signal includes a black level reference voltage (e.g., a reference voltage of pixel circuit before it has generated image charge) and an image signal voltage indicative of image charge generated by photodiode 101. The black level reference voltage may be stored on first capacitor 115, and the image signal voltage may be stored on second capacitor 121. The signals may be output at separate times from pixel circuitry.

In the illustrated example, third capacitance 127 (e.g., a parasitic capacitance) is coupled to ground between a first terminal of boost transistor 125 and the first output switch, and fourth capacitance 133 (e.g., a parasitic capacitance) is also coupled to ground between a second terminal of boost transistor 125 and the second output switch. One of skill in the art will appreciate that capacitors described herein may include parasitic capacitances, as well as doped wells, plate capacitors, metal capacitors, or the like. Transistors 153 and 155 are coupled to power rails. Transistor 149 is coupled between transistors 143 and 155, and transistor 147 is coupled between transistors 153 and 145. Transistors 157 and 151 are coupled to the control terminals of transistors 155 and 149, respectively.

FIG. 1B illustrates an example timing diagram for the circuit of FIG. 1A, in accordance with the teachings of the present disclosure. As shown, b1_boost turns on immediately after sh1 and sh2 (e.g., 113 and 119 in FIG. 1A) turn on to average the signals. Then b1_boost is turned off before sh1 and sh2 turn off to retain sh1 and sh2 mismatch info. Bl boost can be turned on before sh1 and sh2 turn on, resulting in output 1 and output 2 ("out1" and "out2", respectively) having additional coupling. It is appreciated that b1_boost can be achieved with a PMOS switch, NMOS switch, or transmission gate, depended on the desired design.

FIG. 2A shows an example circuit diagram of part of an image sensor 200, in accordance with the teachings of the present disclosure. It is appreciated that image sensor 200 is similar to the image sensor of FIG. 1A, however, FIG. 2A further includes first capacitance 261 and second capacitance 263 coupled to alter a capacitance of first capacitor 215 and second capacitor 221, respectively (e.g., by applying a voltage to the control terminals of the devices). In the depicted example, first capacitance 261 and second capacitance 263 include a first metal-oxide-semiconductor capacitor ("MOSCAP") device and second MOSCAP device, respectively. In the depicted example, the first MOSCAP device and second MOSCAP device hold equal or less charge than first sample and hold transistor 213 and second sample and hold transistor 219, respectively (e.g., the MOSCAPs are ~0.8-1× the size of sh1 213 and sh2 219). The size ratio of 0.8-to-1 of sh3 to sh1 and sh2 is chosen based on simulations so that sh3 counterbalances the disturbance of sh1/sh2 with the right amount of voltage impact. In some embodiments, the MOSCAPs may be replaced by metal-insulator-metal (MIM) capacitors.

Figure 2B:
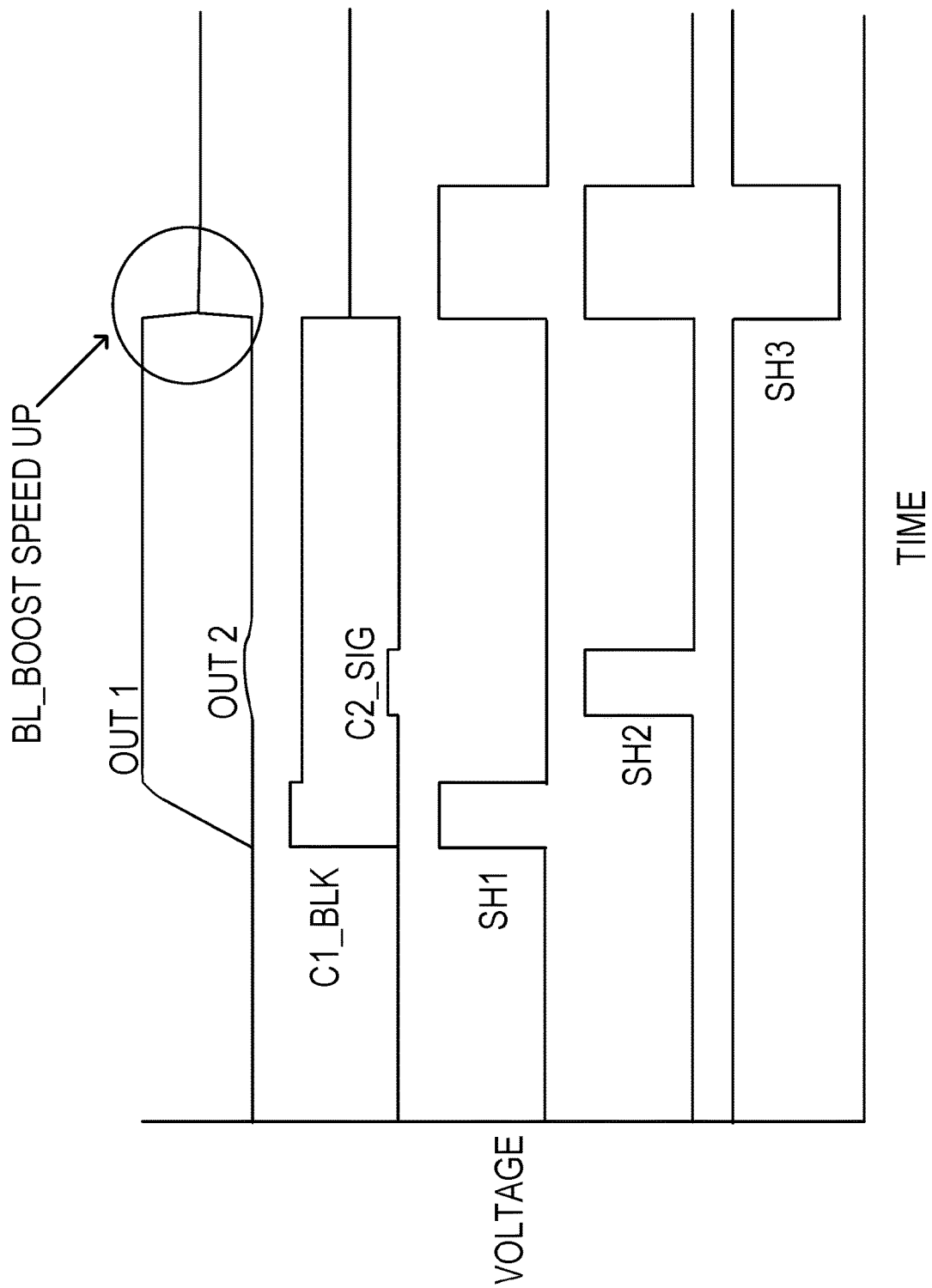
FIG. 2B illustrates a timing diagram for the circuit diagram of FIG. 2A, in accordance with the teachings of the present disclosure.

As will be shown in the timing diagram in FIG. 2B, additional boost bitline speed is achieved by adding charge injection and feed through removal (due to falling edges of sh1 and sh2) with the MOSCAPS. The sh3 offset compensation MOSCAP transistors turn on during the average sample and hold time. Sh1 and sh2 come on at the same time to merge (share or average) the charges of C1_blk and C2_sig together, while output 1 and output 2 are also averaged under the control of b1_boost.

In the depicted example, the first MOSCAP device and the second MOSCAP device are matched with charge distribution of the first sample and hold transistor and the second sample and hold transistor, respectively. In some examples, matched with charge distribution means that when the rising edges of sh1/sh2 and the falling edge of sh3 meet each other, the falling sh3 minimizes (e.g., offsets or balances) the impact of the rising sh1/sh2 from spreading to OUT1/OUT2 through transistors 217/223. This "offset to 0 effect" is balanced between the (value of) first capacitance 261 and the gate-to-source capacitance of 213, and also, second capacitance 263 and gate-to-source capacitance of transistor 219.

FIG. 2B illustrates a timing diagram for the circuit diagram of FIG. 2A, in accordance with the teachings of the present disclosure. During the 2$^{nd}$ phase (readout) of the voltage domain global shutter, the bitline settling time is determined by the difference between the image signal and black signal level. In a simple RC network, settling time is longer for larger input swing. Accordingly, adding the MOSCAP devices depicted in FIG. 2A improves the settling speed by adding a charge injection/feedthrough mechanism. This contribution may dramatically improve bitline settling time especially for the small settling error requirement.

Figure 3:
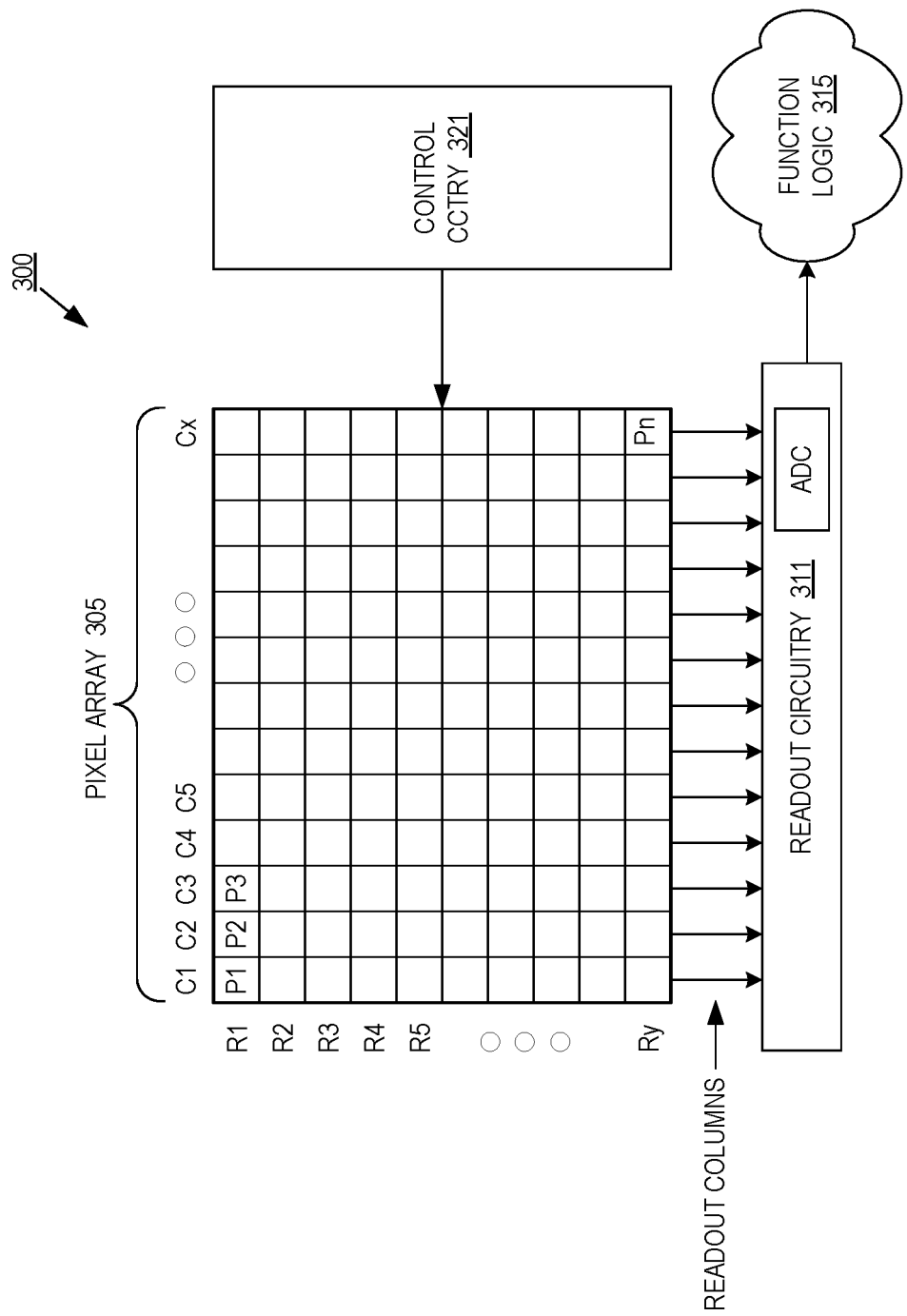
FIG. 3 depicts a block diagram of an example imaging system including the image sensor of FIG. 1A or FIG. 2A, in accordance with the teachings of the present disclosure.

FIG. 3 depicts an example block diagram of an imaging system 300 including the image sensor of FIG. 1A or FIG. 2A, in accordance with the teachings of the present disclosure. Imaging system 300 includes pixel array 305, control circuitry 321, readout circuitry 311, and function logic 315. In one example, pixel array 305 is a two-dimensional (2D) array of photodiodes, or image sensor pixels (e.g., pixels P1, P2 . . . , Pn). As illustrated, photodiodes are arranged into rows (e.g., rows R1 to Ry) and columns (e.g., column C1 to Cx) to acquire image data of a person, place, object, etc., which can then be used to render a 2D image of the person, place, object, etc. However, photodiodes do not have to be arranged into rows and columns and may take other configurations.

In one example, after each image sensor photodiode/pixel in pixel array 305 has acquired its image data or image charge, the image data is readout by readout circuitry 311 and then transferred to function logic 315. In various examples, readout circuitry 311 may include amplification circuitry, analog to digital conversion circuitry (e.g., the ADC depicted to convert the pixel signal into digital image data), and the like. Function logic 315 may simply store the image data or even manipulate the image data by applying post image effects (e.g., crop, rotate, remove red eye, adjust brightness, adjust contrast, or otherwise). In one example, readout circuitry 311 may readout a row of image data at a time along readout column lines (illustrated) or may readout the image data using a variety of other techniques, such as a serial readout or a full parallel readout of all pixels simultaneously.

In one example, control circuitry 321 is coupled to pixel array 305 to control operation of the plurality of photodiodes in pixel array 305. For example, control circuitry 321 may generate a shutter signal for controlling image acquisition. In one example, the shutter signal is a global shutter signal for simultaneously enabling all pixels within pixel array 305 to simultaneously capture their respective image data during a single acquisition window. In another example, the shutter signal is a rolling shutter signal such that each row, column, or group of pixels is sequentially enabled during consecutive acquisition windows. In another example, image acquisition is synchronized with lighting effects such as a flash.

In one example, imaging system 300 may be included in an automobile, cell phone, camera, or the like. Additionally, imaging system 300 may be coupled to other pieces of hardware such as a processor (general purpose or otherwise), memory elements, output (USB port, wireless transmitter, HDMI port, etc.), lighting/flash, electrical input (keyboard, touch display, track pad, mouse, microphone, etc.), and/or display. Other pieces of hardware may deliver instructions to imaging system 300, extract image data from imaging system 300, or manipulate image data supplied by imaging system 300.

Figure 4:
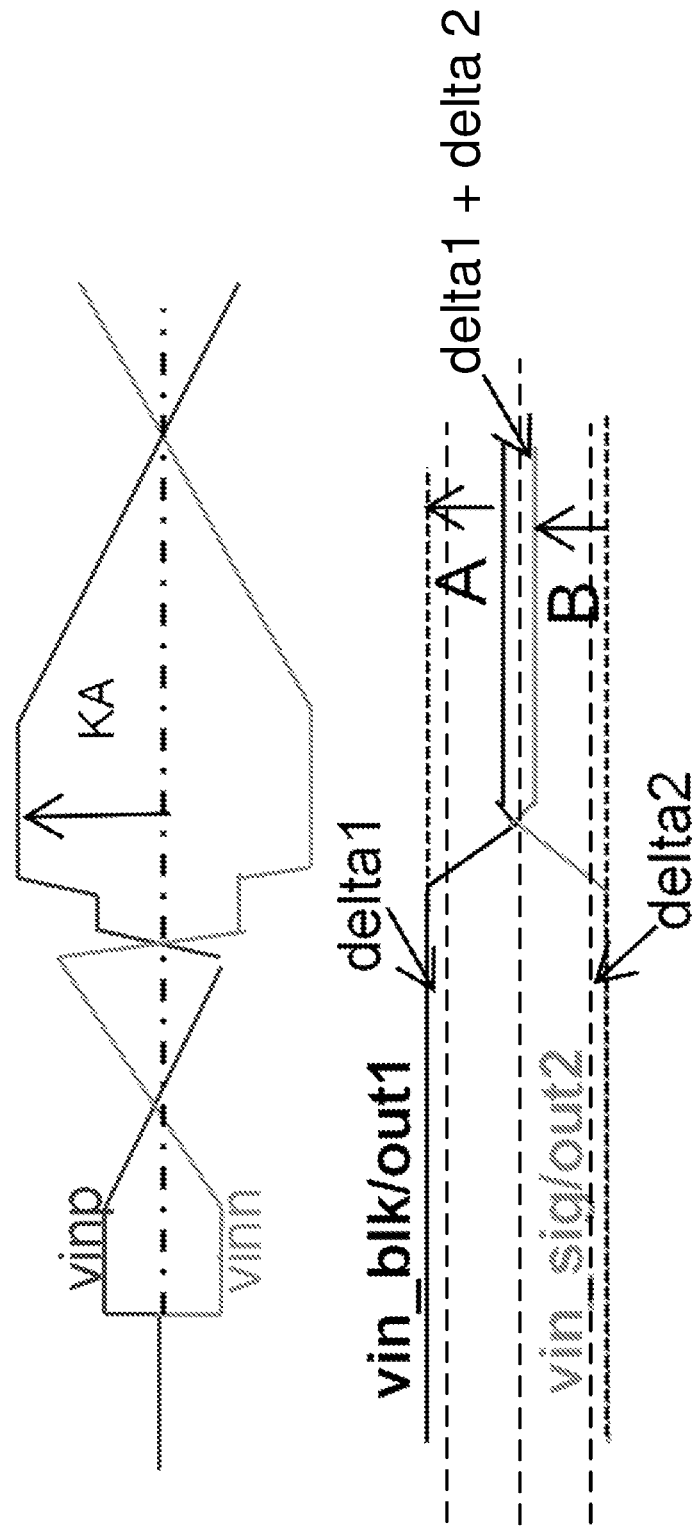
FIG. 4 depicts an illustration of an example column comparator operation, in accordance with the teachings of the present disclosure.

FIG. 4 depicts an illustration of an example column comparator ramp operation, in accordance with the teachings of the present disclosure. As discussed above, the system here may turn on b1_boost immediately after sh1 and sh2 turn on to average the signals. The system then turns off b1_boost before sh1 and sh2 turn off to keep the sh1/sh2 mismatch info. This force and release operation is designed to purposely tune the width of the b1_boost signal so that it can force output 1 and output 2 towards a middle level quickly, and then in the b1_boost release mode, output 1 and output 2 can settle separately to keep the mismatch information (delta1+delta2) in two different bitlines. The short pulse of "b1_boost" is to both (1) force the merging of C1_BLK and C2_SIG when b1_boost is on, and (2) to allow the two columns (BLK/SIG) to relax back to their original natural delta1 and delta2 when b1_boost is off, therefore, when A and B (FIG. 4) are measured by the ADC, both delta1 and delta2 have been automatically cancelled out. Put another way, the turning off of b1_boost may be used to make sure that the intrinsic delta1 and delta2 are not showing in the picture of the measurements of the BLK/SIG signals. It is appreciated that delta1 and delta2 represent each bitline output on-silicon voltage deviation from an ideal voltage value without mismatch. For example, process, temperature, and voltage variance on a source follower device compared to an ideal device working with a stable supply at room temperature.

The above description of illustrated examples of the invention, including what is described in the Abstract, is not intended to be exhaustive or to limit the invention to the precise forms disclosed. While specific examples of the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific examples disclosed in the specification. Rather, the scope of the invention is to be determined entirely by the following claims, which are to be construed in accordance with established doctrines of claim interpretation.

What is claimed is:

1. An image sensor, comprising:
   pixel circuitry, including a photodiode disposed in an image wafer, to receive light and output a pixel signal; and
   readout circuitry, including:
      a first sample and hold transistor coupled to the pixel circuitry;
      a first capacitor coupled to the first sample and hold transistor to receive the pixel signal when the first sample and hold transistor is turned on;
      a second sample and hold transistor coupled to the pixel circuitry;
      a second capacitor coupled to the second sample and hold transistor to receive the pixel signal when the second sample and hold transistor is turned on;
      a first output switch coupled to output the pixel signal from the first capacitor;
      a second output switch coupled to output the pixel signal from the second capacitor; and
      a boost transistor coupled to connect the first output switch and the second output switch when the boost transistor is turned on.

2. The image sensor of claim 1, wherein when the boost transistor is turned on, a voltage at the first output switch and the second output switch is equalized.

3. The image sensor of claim 1, wherein the pixel signal includes a black level reference voltage and an image signal voltage indicative of image charge generated by the photodiode, and wherein the black level reference voltage is stored on the first capacitor, and wherein the image signal voltage is stored on the second capacitor.

4. The image sensor of claim 1, wherein the pixel circuitry includes:
   a floating diffusion;
   a transfer gate coupled to transfer charge from the photodiode to the floating diffusion;
   a source follower transistor coupled to the floating diffusion amplify the charge in the floating diffusion; and
   a row select transistor coupled to output the pixel signal to the first capacitor and the second capacitor.

5. The image sensor of claim 1, further comprising a first capacitance and a second capacitance coupled to alter a capacitance of the first capacitor and the second capacitor, respectively.

6. The image sensor of claim 5, wherein the first capacitance and the second capacitance include a first MOSCAP device and a second MSOCAP device, respectively, wherein the first MOSCAP device and the second MOSCAP device are matched with charge distribution of the first sample and hold transistor and the second sample and hold transistor, respectively.

7. The image sensor of claim 1, further comprising:
   a third capacitance appears where a first terminal of the boost transistor couples to the first output switch; and
   a fourth capacitance appears where a second terminal of the boost transistor couples to the second output switch.

8. The image sensor of claim 1, wherein the first output switch and the second output switch both include an NMOS transistor and a PMOS transistor.

9. The image sensor of claim 1, further comprising:
   a first amplifier transistor with a first control terminal coupled to the first capacitor to amplify the pixel signal on the first capacitor; and
   a second amplifier transistor with a second control terminal coupled to the second capacitor to amplify the pixel signal on the second capacitor.

10. The image sensor of claim 1, wherein a logic wafer includes the readout circuitry and is coupled to the non-illuminated side of the image wafer.

11. An imaging system, comprising:
   a plurality of photodiodes disposed in an imaging wafer and arranged into an array to receive image light, wherein each photodiode in the plurality of photodiodes is included in pixel circuitry to output a pixel signal;
   readout circuitry disposed, at least in part, in a logic wafer coupled to the image wafer, the readout circuitry including:
      a first sample and hold transistor coupled to the pixel circuitry;
      a first capacitor coupled to the first sample and hold transistor to receive the pixel signal when the first sample and hold transistor is turned on;
      a second sample and hold transistor coupled to the pixel circuitry
      a second capacitor coupled to the second sample and hold transistor to receive the pixel signal when the second sample and hold transistor is turned on;
      a first output switch coupled to output the pixel signal from the first capacitor;
      a second output switch coupled to output the pixel signal from the second capacitor; and
      a boost transistor coupled to connect the first output switch and the second output switch when the boost transistor is turned on.

12. The imaging system of claim 11, wherein when the boost transistor is turned on, a voltage at the first output switch and the second output switch is equalized.

13. The imaging system of claim 11, wherein the pixel signal includes a black level reference voltage and an image signal voltage indicative of image charge generated by the photodiode, and wherein the black level reference voltage is stored on the first capacitor, and wherein the image signal voltage is stored on the second capacitor.

14. The imaging system of claim 11, wherein the pixel circuitry includes:
   a floating diffusion;
   a transfer gate coupled to transfer charge from the photodiode to the floating diffusion;
   a source follower transistor coupled to the floating diffusion amplify the charge in the floating diffusion; and
   a row select transistor coupled to output the pixel signal to the first capacitor and the second capacitor.

15. The imaging system of claim 11, further comprising a first capacitance and a second capacitance coupled to alter a capacitance of the first capacitor and the second capacitor, respectively.

16. The imaging system of claim 15, wherein the first capacitance and the second capacitance include a first MOSCAP device and a second MSOCAP device, wherein the first MOSCAP device and the second MOSCAP device are matched with charge distribution of the first sample and hold transistor and the second sample and hold transistor, respectively.

17. The imaging system of claim 11, further comprising:
   a third capacitance appears where a first terminal of the boost transistor couples to the first output switch; and
   a fourth capacitance appears where a second terminal of the boost transistor couples to the second output switch.

18. The imaging system of claim 11, wherein the logic wafer is coupled to a non-illuminated side of the image wafer, and wherein the image wafer is coupled to the logic wafer with a boding oxide.

19. The imaging system of claim 11, further comprising an analog to digital converter coupled to receive the pixel signal and covert the pixel signal into digital image data.

20. The imaging system of claim 11, further comprising function logic coupled to receive the digital image data and manipulate the digital image data.

* * * * *

UNITED STATES PATENT AND TRADEMARK OFFICE
CERTIFICATE OF CORRECTION

PATENT NO. : 10,834,351 B2  
APPLICATION NO. : 16/199887  
DATED : November 10, 2020  
INVENTOR(S) : R. Wang et al.

Page 1 of 1

It is certified that error appears in the above-identified patent and that said Letters Patent is hereby corrected as shown below:

In the Claims

| Column | Line | Claim | |
|--------|------|-------|---|
| 8      | 50   | 11    | change "circuitry" to -- circuitry; --. |
| 10     | 12   | 10    | change "boding" to -- bonding --. |

Signed and Sealed this  
Eighth Day of August, 2023

Katherine Kelly Vidal  
*Director of the United States Patent and Trademark Office*